(12) United States Patent
Helm et al.

(10) Patent No.: US 9,321,109 B2
(45) Date of Patent: Apr. 26, 2016

(54) POWER OPERATED CHUCK

(71) Applicant: SMW-AUTOBLOK Spannsysteme GmbH, Meckenbeuren (DE)

(72) Inventors: Peter Helm, Meckenbeuren (DE); Harald Deininger, Friedrichshafen (DE)

(73) Assignee: SMW-AUTOBLOK Spannsysteme GmbH (DE)

( * ) Notice: Subject to any disclaimer, the term of this patent is extended or adjusted under 35 U.S.C. 154(b) by 400 days.

(21) Appl. No.: 13/912,704

(22) Filed: Jun. 7, 2013

(65) Prior Publication Data

US 2014/0001712 A1    Jan. 2, 2014

(30) Foreign Application Priority Data

Jun. 20, 2012 (EP) .................................. 12172692
Jan. 8, 2013 (EP) .................................. 13150512

(51) Int. Cl.
*B23B 31/30* (2006.01)
*B23B 31/12* (2006.01)
*B23B 31/16* (2006.01)

(52) U.S. Cl.
CPC ......... *B23B 31/1253* (2013.01); *B23B 31/1215* (2013.01); *B23B 31/1223* (2013.01);
(Continued)

(58) Field of Classification Search
CPC ............ B23B 31/1215; B23B 31/1223; B23B 31/1253; B23B 31/16; B23B 2215/72; B23B 2231/22; B23B 2260/008; B23B 2260/0082; B23B 2260/026; B23B 2260/116; B23B 2270/12; B23B 31/302; B23B 31/16229; Y10T 279/224; Y10T 279/1241; Y10T 279/17666; Y10T 279/19; Y10T 279/1291
USPC .............................. 279/20.1, 4.12, 4.1, 4.06
See application file for complete search history.

(56) References Cited

U.S. PATENT DOCUMENTS 1,812,006 A * 6/1931 Jellicoe ................. B23B 31/185
279/106
1,839,400 A * 1/1932 Lewis ................. B23B 31/1622
279/119

(Continued)

FOREIGN PATENT DOCUMENTS

DE    317154    12/1919
DE    3304876 A1    8/1984

(Continued)

*Primary Examiner* — Eric A Gates
*Assistant Examiner* — Paul M Janeski
(74) *Attorney, Agent, or Firm* — Pandiscio & Pandiscio (57) ABSTRACT

A chuck assembly for supporting cylindrically shaped workpieces to be machined at their ends, the assembly comprising
  a body having a passage in its lengthways axis,
  a driving for providing an actuation force absorbed by an actuating pin axially movable in the body,
  a guide hole in the body having the actuating pin therein, and
  centring jaws, mounted in a guide groove in the chuck body and moveable radially toward the workpiece, each in a driving arrangement an actuating pin.
A roller provided on the driving means facing the actuating pin, a contact surface is on a free end of the pin at right angles to the lengthways axis of the chuck body. The contact surface and the roller interacting such that forces of driving means transfer onto the contact surface axially, and simultaneously a movement at right angles to the lengthways axis of the chuck body is released between the contact surface of the actuating pin and the roller.

27 Claims, 12 Drawing Sheets

(52) U.S. Cl.
CPC ............. *B23B31/16* (2013.01); *B23B 2215/72* (2013.01); *B23B 2231/22* (2013.01); *B23B 2260/0082* (2013.01); *B23B 2260/026* (2013.01); *B23B 2260/116* (2013.01); *B23B 2270/12* (2013.01); *Y10T 279/1224* (2015.01); *Y10T 279/1241* (2015.01); *Y10T 279/17666* (2015.01)

(56) References Cited

U.S. PATENT DOCUMENTS

| | | | |
|---|---|---|---|
| 2,538,521 A | | 1/1951 | Huntting |
| 2,859,042 A | * | 11/1958 | Drissner ................. B23B 31/18 279/108 |
| 2,903,268 A | | 9/1959 | Buck et al. |
| 2,974,968 A | * | 3/1961 | Garrison ............. B23B 31/1207 279/106 |
| 3,104,886 A | * | 9/1963 | Hohwart ................. B23B 31/18 269/261 |
| 3,248,122 A | * | 4/1966 | Roddy ................ B23B 31/1215 269/137 |
| 3,560,009 A | * | 2/1971 | Renoux ............... B23B 31/1253 279/120 |
| 3,633,929 A | * | 1/1972 | Morawski ............... B21J 13/08 279/127 |
| 4,121,848 A | * | 10/1978 | Morawski ........... B23B 31/1215 279/110 |
| 4,312,513 A | | 1/1982 | Swenson |
| 4,437,675 A | * | 3/1984 | Koenig, III ............. B23B 31/14 279/119 |
| 4,482,162 A | * | 11/1984 | Anegawa ........... B23B 31/1223 279/119 |
| 4,530,507 A | * | 7/1985 | Lee, Jr. ............. B23B 31/16275 279/123 |
| 4,558,876 A | * | 12/1985 | Call .................... B23B 31/1223 279/110 |
| 4,570,949 A | * | 2/1986 | Morawski ........... B23B 31/1253 279/110 |
| 4,645,219 A | * | 2/1987 | Link ....................... B23B 31/14 279/118 |
| 5,052,700 A | * | 10/1991 | Howard ............ B23B 31/16229 279/106 |
| 6,116,617 A | * | 9/2000 | Kofler ................. B23B 31/1253 279/106 |
| 2004/0140629 A1 | * | 7/2004 | Onyszkiewicz ..... B23B 31/1215 279/141 |
| 2004/0169342 A1 | * | 9/2004 | Nishimiya ........ B23B 31/16266 279/121 |
| 2005/0067797 A1 | * | 3/2005 | Onyszkiewicz ..... B23B 31/1253 279/121 |
| 2012/0200049 A1 | * | 8/2012 | Taglang ................. B23B 31/18 279/37 |

FOREIGN PATENT DOCUMENTS

| | | |
|---|---|---|
| DE | 19502363 | 1/1996 |
| DE | 10203667 | 7/2003 |
| DE | 102006027988 A1 | 12/2007 |
| EP | 1184111 | 3/2002 |
| EP | 1407845 | 4/2004 |
| EP | 1642662 | 4/2006 |
| EP | 1759793 | 3/2007 |
| JP | H01140905 | 6/1989 |

* cited by examiner

POWER OPERATED CHUCK

BACKGROUND OF THE INVENTION

1. Field of the Invention

The present invention relates to a power-operated chuck for supporting cylindrically shaped workpieces which are to be machined by means of a machine tool in the area of their free ends.

2. Description of the Prior Art

Power-operated chucks of this kind have been produced successfully by the Applicant for decades under the identification Big Bore® and placed on the market. These power-operated chucks have a passage opening extending in the lengthways axis of the power-operated chuck, in order to accommodate a workpiece to be machined.

In order to position the cylindrically shaped workpiece as exactly centrally as possible in relation to the lengthways axis of the chuck, the chuck body of the chuck is provided with three centring jaws arranged at 120° intervals from one another in the circumferential direction of the workpiece, and which are advanced synchronously by means of a drive piston in the direction of the workpiece, with the effect that the centring jaws simultaneously make active contact with the workpiece, or change the position of the workpiece in such a way that, once the centring jaws have been completely advanced, the workpiece is aligned exactly centrally in relation to the lengthways axis of the power-operated chuck.

For this purpose, the three centring jaws are mounted in a guide groove in a manner which allows radial movement, because the axial advance movement of the drive element in the form of a piston rod is redirected by means of a wedge bar when the axial advance movement has finished. The result is an axial advance movement of the piston rod onto the wedge bar, in a manner which approaches as far as possible the area of the free end of the workpiece to be machined, so as to secure it in the space centrally in relation to the lengthways axis, since it is in this area that machining of the workpiece takes place. Following this, the centring jaws slip along the wedge bar in a radial direction, and enter into active contact with the workpiece.

Once the workpiece has been positioned centrally by means of the three centring jaws, three clamping jaws inserted in the chuck are advanced towards the workpiece, these clamping jaws being arranged between the centring jaws in the chuck. As soon as the clamping jaws enclose the positioned workpiece, the centring jaws can be separated from the workpiece in order to release it for machining. As long as the centring jaws continue to act on the workpiece, it is inaccessible for machining. As a result, the clamping jaws move through a plane that is at a distance from the plane formed by the centring jaws.

Although power-operated chucks of this kind have proven effective in practice, it has nevertheless proven to be a disadvantage that the centring jaws or the entire power-operated chuck must be replaced for differently sized diameters of workpiece, because the axial advance travel, as well as the radial movement of the centring jaws over the sloping plane of the wedge bar, have to be selected such that the centring jaws enter into active contact with the workpiece to be machined as close as possible to the free end of the workpiece. Such changeover measures take considerable time and are thus cost-intensive, since the machine tool is stopped during the period of the changeover.

A power-operated chuck with a modified design is disclosed in DE 10 2006 027 988 A1; this chuck has a total of three radially advancing clamping jaws that enter into active contact with the workpiece to be clamped, thereby centring it in the space. For the purpose of actuating the clamping jaws, they are connected to a driving means by an actuating pin. For this purpose, the chuck body is provided with a guide groove worked into it at an angle vectored towards the workpiece or the clamping jaws, in which guide groove the corresponding actuating pin is mounted in an axially movable arrangement.

DE 3304876 A1 also discloses a power-operated chuck of this kind.

It is a disadvantageous feature that the driving means requires a space outside the chuck, since this acts directly on the actuating pin due to the fact that the power transmission takes place onto the actuating pin by means of the driving means in an axial direction. In this case, the advance force is generated by means of a cylinder housing of the driving means, and acts along an axial piston rod. The cylinder housing has an opening arranged pointing radially outwards, which is used for accommodating a driver pin. However, a design of this kind increases the space required by the power-operated chuck considerably in the outwards direction. Often, however, power-operated chucks of this kind are installed in machine tools which have restricted space, as a result of which power-operated chucks of this size cannot be used.

SUMMARY OF THE INVENTION

It is thus the task of the present invention to provide a power-operated chuck of the aforementioned type which, firstly, requires the smallest possible structural space within the machine tools and, secondly, permits workpieces to be held centrally on a machine tool with a specified clamping force, without the clamping force damaging or deforming the workpieces.

An anti-friction bearing, for example compromising a roller or plain bearing, is arranged between the driving means and the actuating pin, as a result of which the actuation forces can be transmitted from the driving means onto the actuating pin in the lengthways direction of the chuck body, because the axially acting actuation force is split by the anti-friction bearing or the plain bearing into two force components running both in the lengthways direction of the chuck body and at right angles to it. This is accomplished in particular in that, firstly, the guide groove in which the actuating pin is mounted in a moving arrangement is sloping in relation to the lengthways axis of the chuck body and in the direction of the centring jaws or the workpiece to be clamped. Secondly, the arrangement of the anti-friction bearing, or the plain bearing, produces a relative movement at right angles to the lengthways axis of the chuck body between the driving means, that can be moved parallel to the lengthways axis of the chuck body, and the actuating pin that performs not only a parallel movement in relation to the lengthways axis of the chuck body, but also a movement at right angles to that. Attachment of the anti-friction bearing, or the plain bearing, either on the driving means, or on the actuating pin, and the contact surface to be provided, either on the driving means, or on the actuating pin, represents a mechanical measure with equivalent effect.

In order to generate the actuation force, the driving means is configured, in an advantageous embodiment, as a hydraulically or pneumatically operated piston. The actuation force exerted or produced by the piston significantly depends on the diameter of the piston and the pressurisation status of the medium that is filled in the piston space. These geometrical dimensions and the pressurisation status cannot be changed variably during operation of the driving means, which means the actuation force is identical to the clamping force that acts on the workpiece through the three centring jaws.

Often, however, this centring force is much too large in magnitude, as a result of which the workpiece is deformed or irreparably damaged. It is thus particularly advantageous for the actuation force to be reduced during the advance movement of the three centring jaws, in order to provide a lower centring force that is transmitted from the centring jaws onto the workpiece. For this purpose, the driving means is configured using two advance and clamping pistons mounted one inside the other in a telescopic arrangement.

The advance piston is provided with a significantly larger surface area facing the pressure space than the clamping piston, which is also mounted in the advance piston. The axial stroke movement of the advance piston is limited by means of a stop surface worked onto the chuck body, as a result of which the stroke travel of the clamping piston takes place within a precisely specified space.

Furthermore, the actuation force applied at a higher position on the advance piston permits rapid advance, or movement, of the three centring jaws. It is only when the movement of the advance piston is stopped by the stop surface of the chuck body that further movement of the centring jaws takes place by means of the clamping piston, radially in the direction of the workpiece to be clamped.

As a result, both rapid advance and the precisely required centring force of the centring jaws can be achieved with an identical pressurisation status.

If it becomes apparent that the centring force applied at the centring jaws is excessive for the workpiece to be clamped, further design measures can be used to reduce the surface area of the clamping piston. For example, the surface area of the clamping piston can be configured in the shape of a polygonal structure in order to reduce its surface area, and/or passage openings are worked into the surface of the clamping piston into which guide rods with the corresponding contour running parallel to the movement direction of the clamping piston can be attached in a positionally oriented way. These guide rods and their corresponding passage openings can have a round, or kidney-shaped, curved cross-section. As a result, the clamping piston slides along the guide rods.

It is particularly advantageous if the actuating pin is mounted in a stabilisation sleeve in such a way as to be partially movable in relation to that stabilisation sleeve, for the stabilisation sleeve to be supported on the inner wall of the guide hole, and for part of the movement of the actuating pin to take place up to a specified stop before being stopped, as a result of which a relative movement takes place between the actuating pin and the stabilisation sleeve. This is because the stabilisation sleeve allows the projection travel of the actuating pin from the chuck body to be increased, as a result of which the freedom of movement of the actuating pin, and thus of the centring jaws, is increased. This provides the result that the centring jaws can have an effect on the workpiece over an increased centring interval in relation to the jacket surface of the workpiece to be centred, and the positioning of the centring jaws in relation to the workpiece can be adjusted freely, depending on the diameter of the workpiece.

BRIEF DESCRIPTION OF THE DRAWINGS

The drawings show a power-operated chuck configured in accordance with the present invention, with various design embodiments which can be combined with one another as required, the details of which are explained below. In the drawings.

DESCRIPTION OF THE PREFERRED EMBODIMENTS

Figure 1:
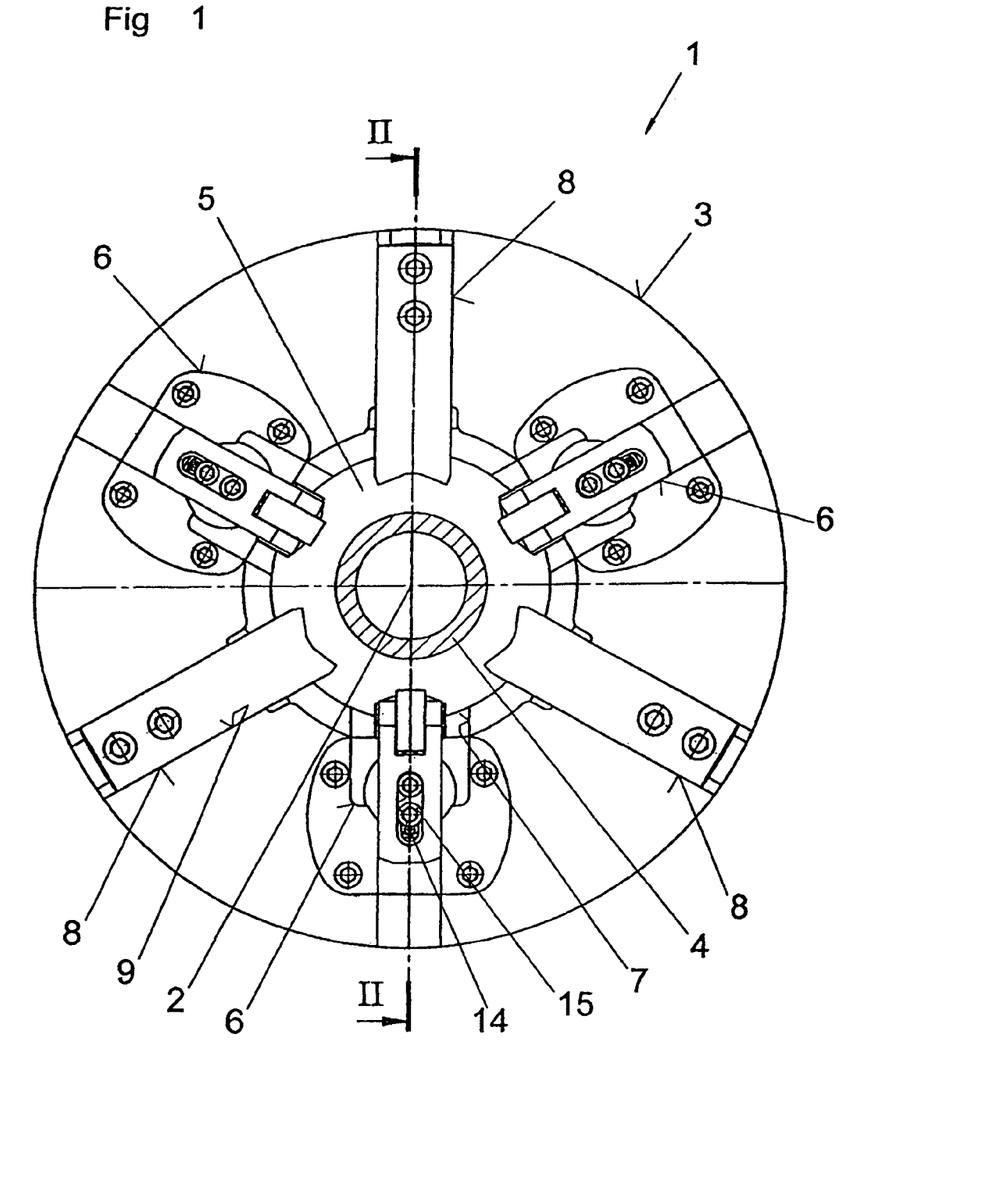
FIG. 1 is a front elevational view of a power-operated chuck having three centring jaws and three clamping jaws arranged adjacent to one another in the chuck for centring or supporting a cylindrically shaped workpiece.

FIG. 1 shows a power-operated chuck 1 by means of which cylindrically shaped workpieces 4 are supported while being machined by a machine tool. A passage hole 5 is worked into a chuck body 3 of the power-operated chuck 1 in order to hold the particular workpiece 4, the centre of which passage hole 5 runs in alignment with a lengthways axis 2 of the power-operated chuck 1 and/or the chuck body 3. The workpiece 4 should be provided with a male or a female thread, in particular on its free ends.

It is necessary to position the workpiece 4 initially in a central position in relation to the lengthways axis 2 of the chuck body 3 in order to achieve machining of the workpiece 4 without defects. For this purpose, the chuck body 3 is provided with three centring jaws 6 inserted in it, each of which is mounted in a radially movable arrangement in a guide groove 7 worked into the chuck body 3. As soon as the centred position of the workpiece 4 is achieved by the advance movement of the three centring jaws 6, three clamping jaws 8 arranged adjacent to the centring jaws 6 are advanced radially in the direction of the workpiece 4 to be clamped. Also, a corresponding clamping jaw 8 is mounted in a radially adjustable arrangement in a guide groove 9 worked into the chuck body 3. As soon as the three clamping jaws 8 are gripping and holding the centred workpiece 4, the three centring jaws 6 can be moved back into the initial position in order to release the area of the workpiece 4 that is to be machined.

Figure 2:
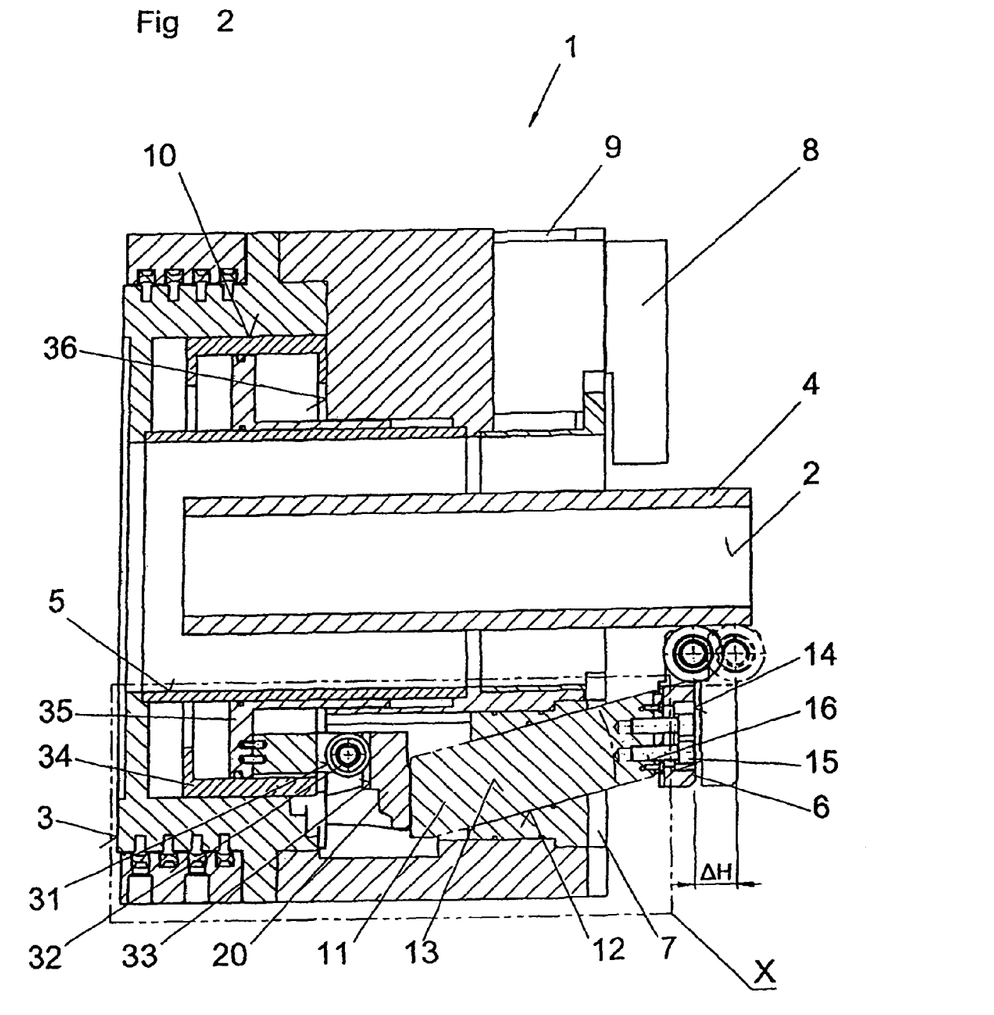
FIG. 2 is a sectional view showing the power-operated chuck in accordance with FIG. 1, with two advance and clamping pistons mounted one inside the other in a telescopic arrangement, in an initial status.
Figure 3A:
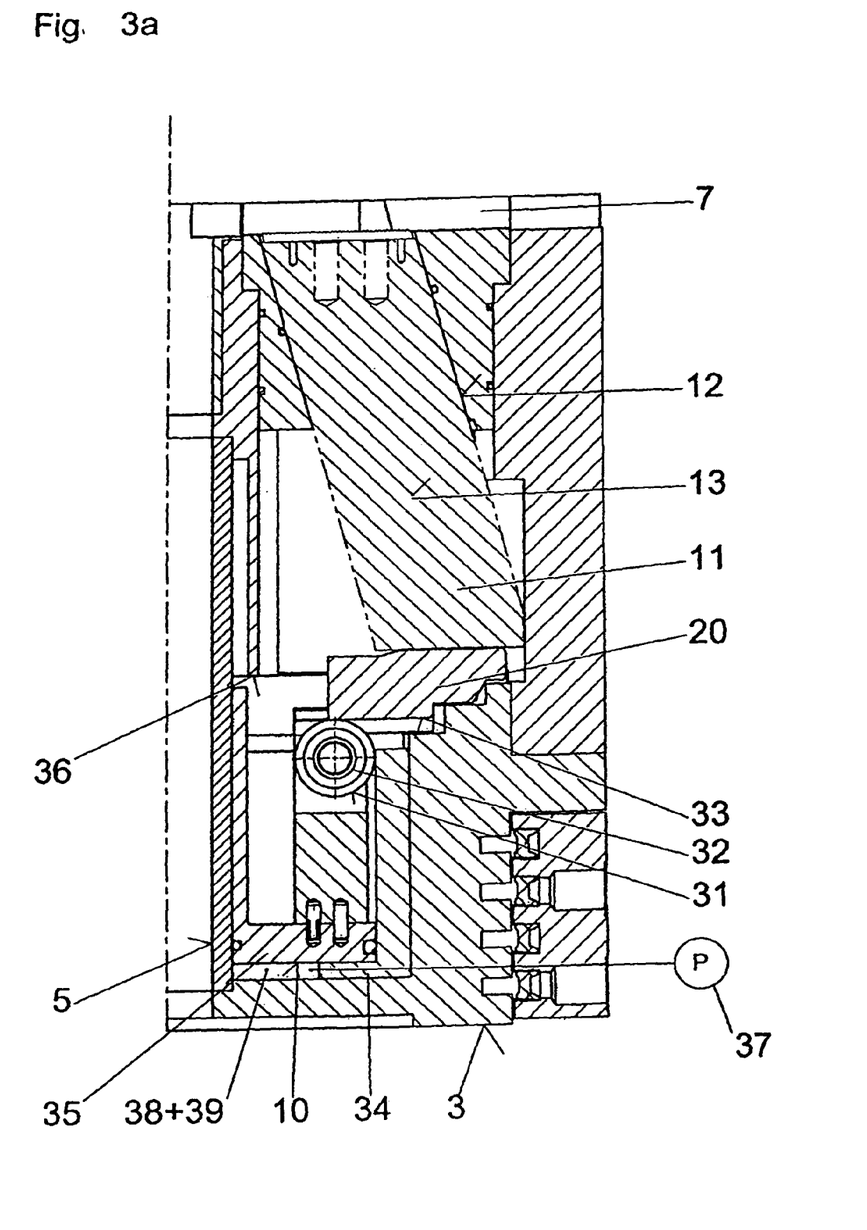
FIG. 3a is a sectional view showing the power-operated chuck in accordance with FIG. 2.

FIGS. 2 and 3a show the initial position of the centring jaws 6. The three centring jaws 6 are in a driving connection with a driving means 10 which, in the sample embodiment, comprises two pneumatically or hydraulically operated advance and clamping pistons 33, 34 which can be adjusted in an axial direction, i.e. parallel to the lengthways axis 2. This means the centring jaws 6 are actuated synchronously and exert an even centring force on the workpiece 4 to be centred, in which case the centring force is distributed evenly in the circumferential direction onto the workpiece 4, as a result of which the workpiece 4 is positioned at least in the centring plane and adjacent to it in such a way that the lengthways axis of the workpiece 4 is aligned flush with the lengthways axis 2 of the chuck body 3.

Furthermore, an actuating pin 11 is provided as an intermediate element between the corresponding centring jaw and the driving means 10, and is inserted in a guide hole 12 worked into the chuck body 3. The guide hole 12 in this case runs at an angle to the lengthways axis 2, in such a way that the distance from a lengthways axis 13 of the guide hole 12 in the area of the centring jaws 6 is smaller than the distance of the guide hole 12 from the lengthways axis 2 which is facing the driving means 10. This means the three guide holes 12 worked into the chuck body 3 are arranged in a funnel or V-shape in the cross-sectional plane. The angle of inclination of the lengthways axis 13 of the corresponding guide hole 12 in relation to the lengthways axis 2 is between 20° and 45°.

The advance piston 34 is mounted in a pressure space 38 in an axially movable arrangement. A medium, such as a gas or a fluid, is pumped into the pressure space 38 via a feed line 37, as a result of which the surface of the advance piston 34 has a pressure applied to it. Depending on the pressure status in the pressure space 38, and depending on the size of the surface of the advance piston 34, an actuation force F is produced which acts on the actuating pin 11, and thus on the centring jaws 6. The advance piston 34 runs parallel to the lengthways axis 2 of the chuck body 3, which means no additional, outward-pointing radial projections are required on the chuck body 3, as a result of which the dimensions of the chuck body 3 can be maintained unchanged compared to other chuck bodies of power-operated chucks.

In order to reduce the actuation force F, and for this reduction to be to a precisely specified magnitude, by means of which damage to the workpiece 4 to be clamped is avoided, a clamping piston 35 is disposed in the advance piston 34. This means the advance piston 34 and the clamping piston 35 are mounted one inside the other, telescopically. As soon as the stroke travel of the advance piston 34 has been reached, the advance piston 34 is in contact with a stop 36 formed onto the chuck body 3, as a result of which it is held firmly. Another pressure space 39 is provided between the advance piston 34 and the clamping piston 35 and communicates with the pressure space 38 by means of the feed line 37, as a result of which identical pressure conditions prevail in the pressure spaces 38 and 39. A pressure change on the pump, or other reduction measures, are thus unnecessary, because the surface area of the clamping piston 35 is significantly smaller compared to the surface area of the advance piston 34, as a result of which the actuation or centring force generated by the clamping piston 35, which acts on the centring jaws 6 via the corresponding actuating pin 11, is significantly reduced.

Figure 3B:
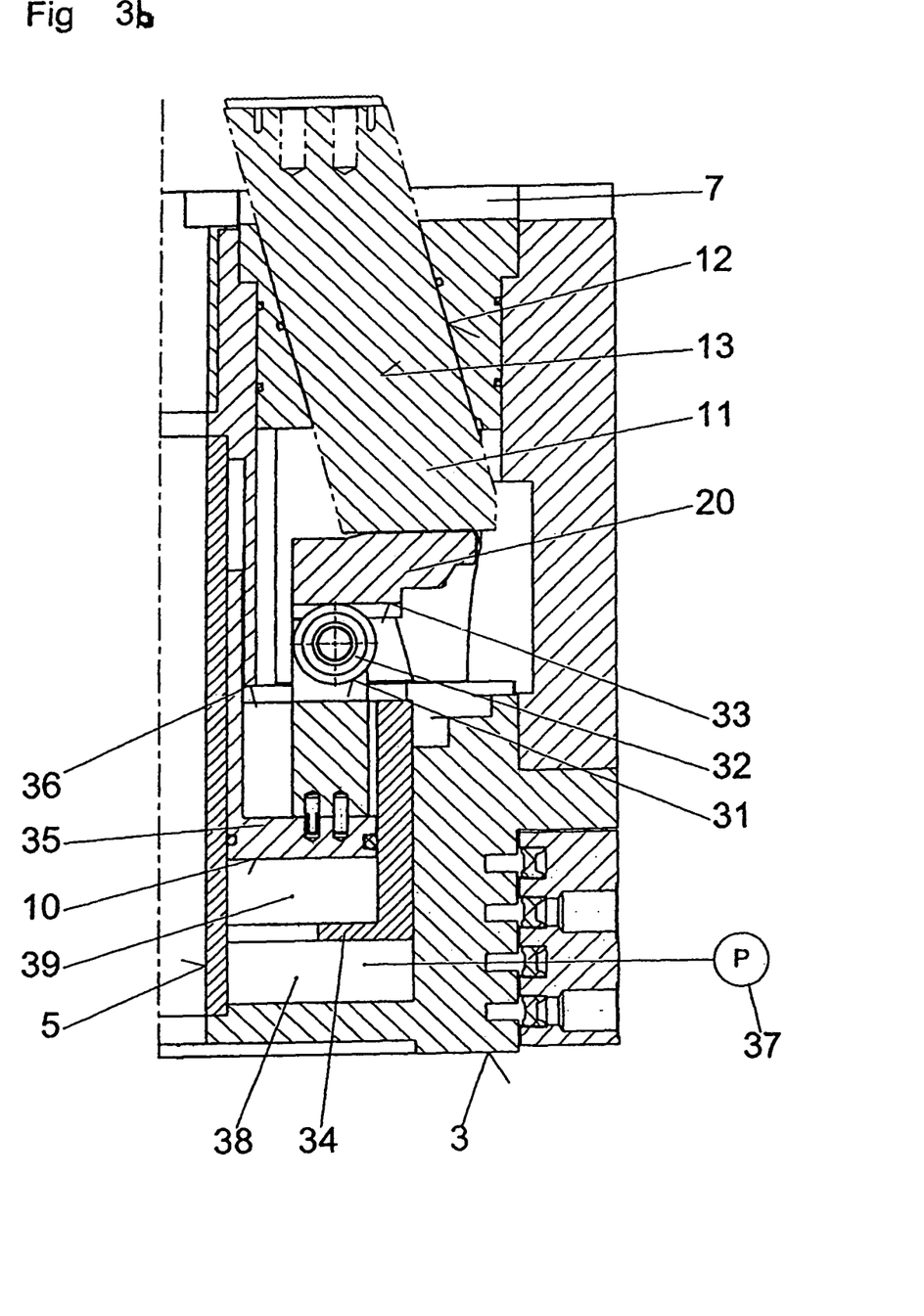
FIG. 3b is a sectional view showing the power-operated chuck in accordance with FIG. 3a, in a centring status.

FIG. 3b shows what is the end position adopted by the advance pistons 34 and the clamping pistons 35 when the centring status is reached. The feed line 37 can be configured as a ring duct, for example, or as a permeable seal within the chuck body 3, through which the forced-in medium flows into the pressure spaces 38 and 39, or is forced out of it when the actuating pins 11 move back. This is because the advance and clamping pistons 34 and 35 can have the corresponding medium applied to them on both sides.

The geometry of the clamping piston 35 and the set pressure condition in the pressure spaces 38 and 39 produce a specified actuation force F which acts on the workpieces 4 to be clamped, as a result of which they are neither deformed nor damaged.

Due to the larger surface dimension of the advance piston 34 compared to the smaller clamping piston 35, the advantageous effect is achieved that a high-speed stroke of the driving means 10 is produced, because due to the higher force conditions prevailing on the advance piston 34, it is moved faster in the axial direction, as a result of which the actuating pins 11, and thus the centring jaws 6, are also moved.

In order to allow the distance between the free end of the centring jaw 6 and the workpiece 4 to be centred to be set, a slot 14 is worked into the corresponding centring jaw 6 and fastening screws 15 are inserted into it, these being screwed into threaded holes 16 worked into the actuating pin 11. The length of the corresponding slot 14 is approximately between one third and two thirds of the length of the centring jaws 6, with the effect that the centring jaw 6 can be variably positioned on the actuating pin 11 in this area. The corresponding centring jaw 6 is held in a guided arrangement by means of the actuating pin 11.

Figure 4A:
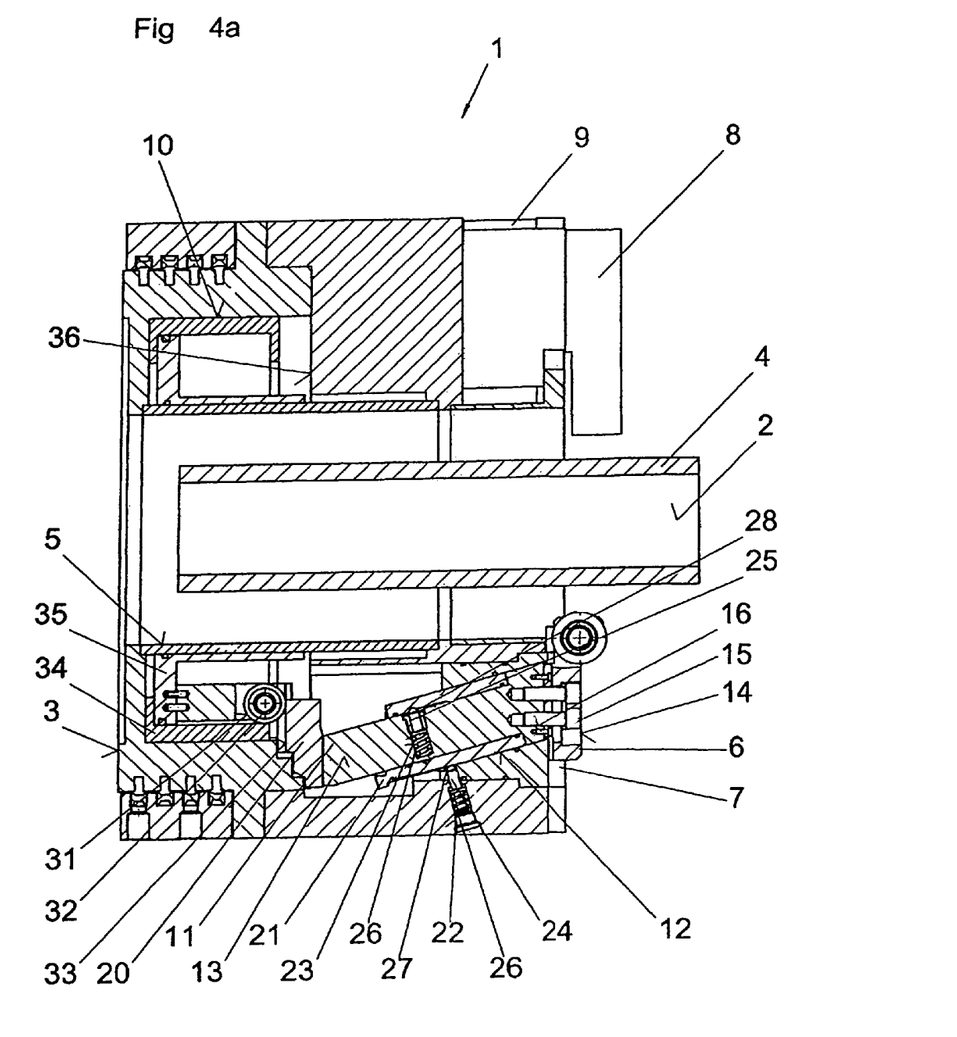
FIG. 4a is a sectional view showing the power-operated chuck in accordance with FIG. 2, with a stabilisation sleeve mounted in a guide groove in an axially movable arrangement, in an initial status.
Figure 4B:
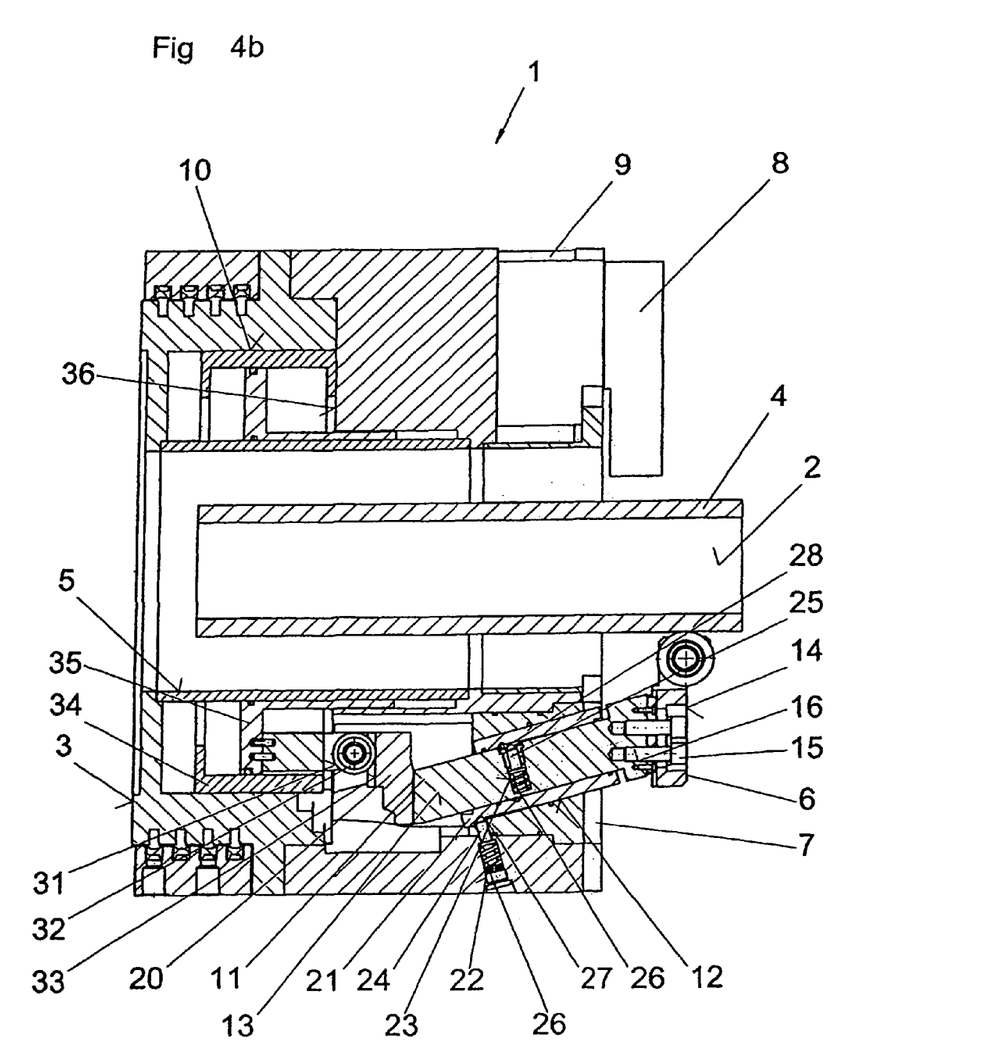
FIG. 4b is a sectional view showing the power-operated chuck in accordance with FIG. 4a, in a clamped status.

Furthermore, as shown in FIGS. 4a and 4b, a stabilisation sleeve 21 is disposed between the actuating pin 11 and the inner wall of the guide hole 12, which has the purpose of supporting the actuating pin 11 when moved out of the chuck body 3, with the effect that the deployment travel of the actuating pin 11 out of the chuck body 3 can be increased because it can be supported by the stabilisation sleeve 21 in the projecting condition.

The stabilisation sleeve 21 accordingly projects partially out of the plane formed by the chuck body 3.

The movement of the stabilisation sleeve 21 relative to the chuck body 3 and the actuating pin 11 is effected by means of two detent pins 24 and 25. In this case, the detent pin 24 is inserted in a hole 22 worked into the chuck body 3 and is in contact with the surface of the stabilisation sleeve 21. Furthermore, a coil compression spring 26 is disposed in the hole 22, by means of which the detent pin 24 is held under preload in the hole 22.

On the opposite side, however with a lateral offset in relation to the detent pin 24, the detent pin 25 is inserted in a hole 23 worked into the actuating pin 11. The detent pin 25 is brought into contact under preload by means of the coil compression spring 26 out of the actuating pin 11 onto the inner jacket surface of the stabilisation sleeve 21. A notch 28 is worked into the inner jacket surface of the stabilisation sleeve 21, and the detent pin 25 engages in the notch 28 in the initial position of the centring jaws 6, as a result of which there is a positive or non-positive active connection between the detent pin 25 and the stabilisation sleeve 21. The detent pin 24 acting on the outer jacket surface of the stabilisation sleeve 21 makes sliding contact with it, as a result of which an axial advance force acting on the actuating pin 11 leads to the actuating pin 11 and the stabilisation sleeve 21 being pushed at the same time. Only when the detent pin 24 inserted in the chuck body 3 projects into a notch 27 worked into the outer jacket surface of the stabilisation sleeve 21 does a positive or non-positive active connection come about there between the stabilisation sleeve 21 and the chuck body 3, leading to the movement of the stabilisation sleeve 21 being stopped, and then a relative movement occurring between the actuating pin 11 and the stabilisation sleeve 21 in order to distance the actuating pin 11, and thus the centring jaw 6, further from the chuck body 3. The active connection between the detent pin 25 and the stabilisation sleeve 21 is then released, as a result of which the detent pin 25 slides along the inner jacket surface of the stabilisation sleeve.

FIGS. 2 to 5c show a transmission body 20 screwed onto the free end of the actuating pin 11, although it can also be produced with the actuating pin 11 made from a common material, as a result of which the actuating pin 11 and the transmission body 20 are configured as a one-piece component. The transmission body 20 is provided with a contact surface 33 facing towards the clamping piston 34 of the driving means 10, which is aligned at right angles to the lengthways axis 2. An anti-friction bearing 31 in the form of a roller 32 is arranged between the contact surface 33 and the clamping piston 34, by means of which the axial actuation force F of the driving means 10 is transferred to the contact surface 33, so that at the same time as the axial movement of the actuating pin 11, a compensating relative movement can take place between the contact surface 33 in the plane at right angles to the lengthways axis 2 because, as shown in particular in FIG. 5a, the contact surface 33 moves during the advance movement of the driving means 10 in the direction of the lengthways axis 2. The anti-friction bearing 31 can also be configured as a plain bearing.

Furthermore, FIG. 4b shows that the detent pin 25 is now projecting into the notch 27 and has fixed the stabilisation sleeve 21 in position. The centring jaws 6 are now in active contact with the workpiece 4, and center it.

Figure 5A:
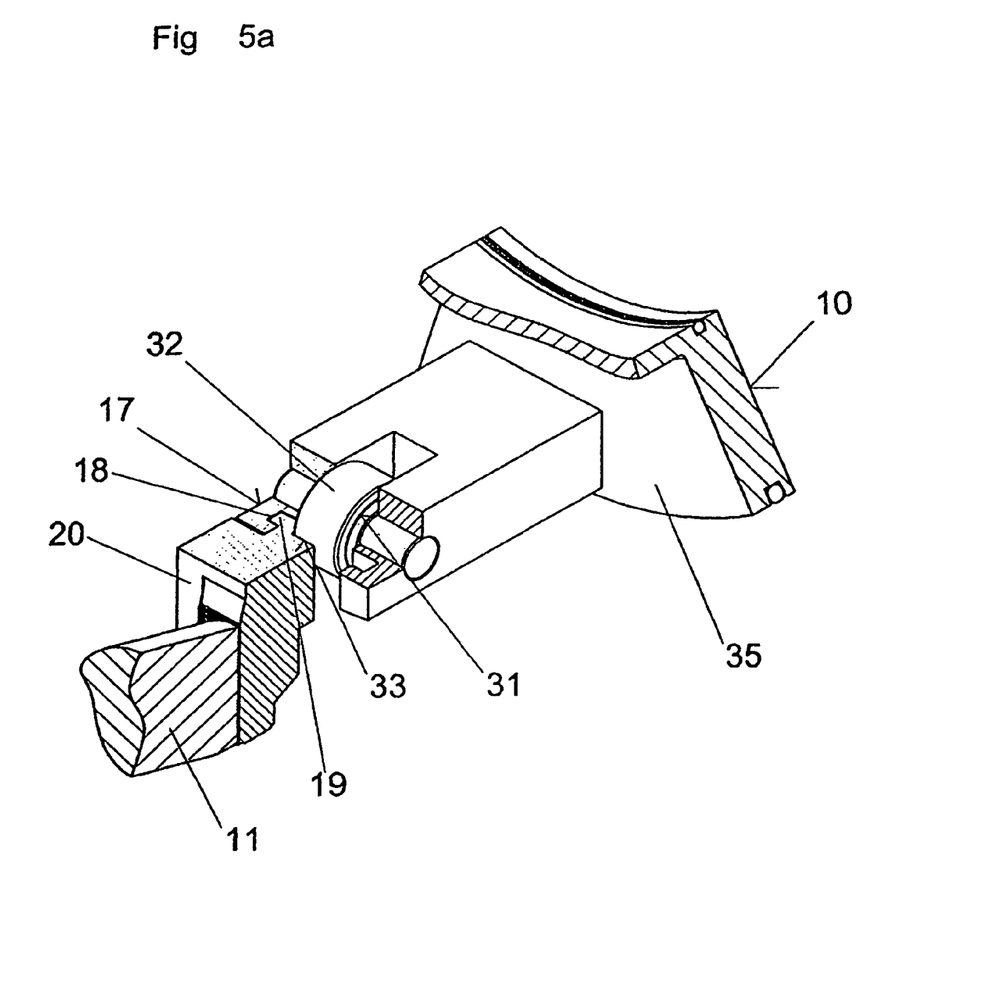
FIG. 5a is a perspective view, showing the power-operated chuck of FIG. 2, in which an anti-friction bearing, in the form of a roller, is attached to a free end of a driving means in the form of a clamping piston, with the roller in contact with a stop surface worked onto an actuating pin, and the stop surface is in active contact with the anti-friction bearing.

Furthermore, FIG. 5a shows how the centring jaws 6 are pulled back from the centred position by means of the driving means 10, and how the roller 32 is attached. Firstly, a sliding pad 17 is provided between the free end of the clamping piston 35 and the actuating pin 11, and is arranged so as to slide inside the chuck body 3. The sliding pad 17 is provided with two guide openings spaced apart and running parallel to one another, which are configured with a U-shaped cross-section in an advantageous embodiment. One rectangular projection 19 each is formed onto the clamping piston 35 and the actuating pin 11, and is mounted in an axially movable arrangement in guide openings 18 of the sliding pad 17.

The roller 32 of the anti-friction bearing 31 is arranged so as to rotate in the sliding pad 17 and is in contact with the contact surface 33 of the actuating pin 11 or the transmission body 20. As soon as the return movement of the clamping piston 35 takes place, the positive active connection between the clamping piston 35 and the actuating pin 11 results in the return movement of the clamping piston 35, also causing the return movement of the actuating pin 11.

As soon as the centring jaws 6 make contact with the outwardly projecting free end of the stabilisation sleeve 21, or on the chuck body 3, the stabilisation sleeve 21 is pulled back by means of the return force of the clamping piston 35, with the effect that the detent connection between the stabilisation sleeve 21 and the chuck body 3 effected by the detent pin 24 is cancelled and the stabilisation sleeve 21 is once again returned jointly with the actuating pin 11.

The configuration variant of the power-operated chuck 1 shown in FIG. 2 is based on the inventive principle that the actuating pin 11 can also be supported directly in the guide hole 12 of the chuck body 3 and can move in relation to the chuck body 3. The stabilisation sleeve 21 provided, in particular in FIGS. 4a and 4b, is not required in this embodiment. Instead, the actuating pin 11 slides or slips back and forth directly inside the guide hole 12, depending on the movement of the piston 10, as explained in detail hereinabove.

The adjustment travel of the actuating pin 11 is restricted in all embodiment variants by limiting the axial stroke travel of the driving means 10.

Figure 5B:
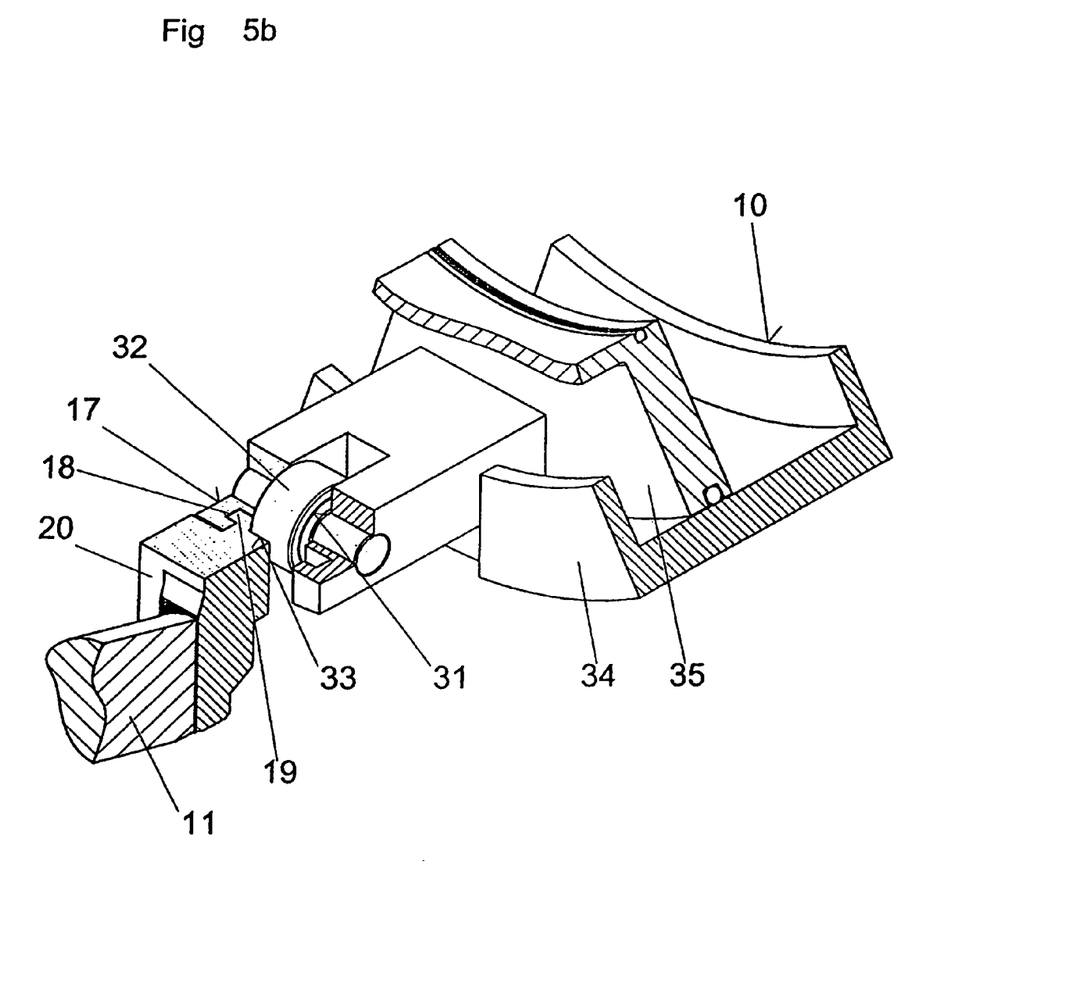
FIG. 5b is a perspective view showing the power-operated chuck in accordance with FIG. 2, in which an anti-friction bearing in the form of a roller is attached to a free end of driving means in the form of a clamping and advance piston, with the roller in contact with a stop surface worked onto the actuating pin, and the stop surface is in active contact with the anti-friction bearing.
Figure 5C:
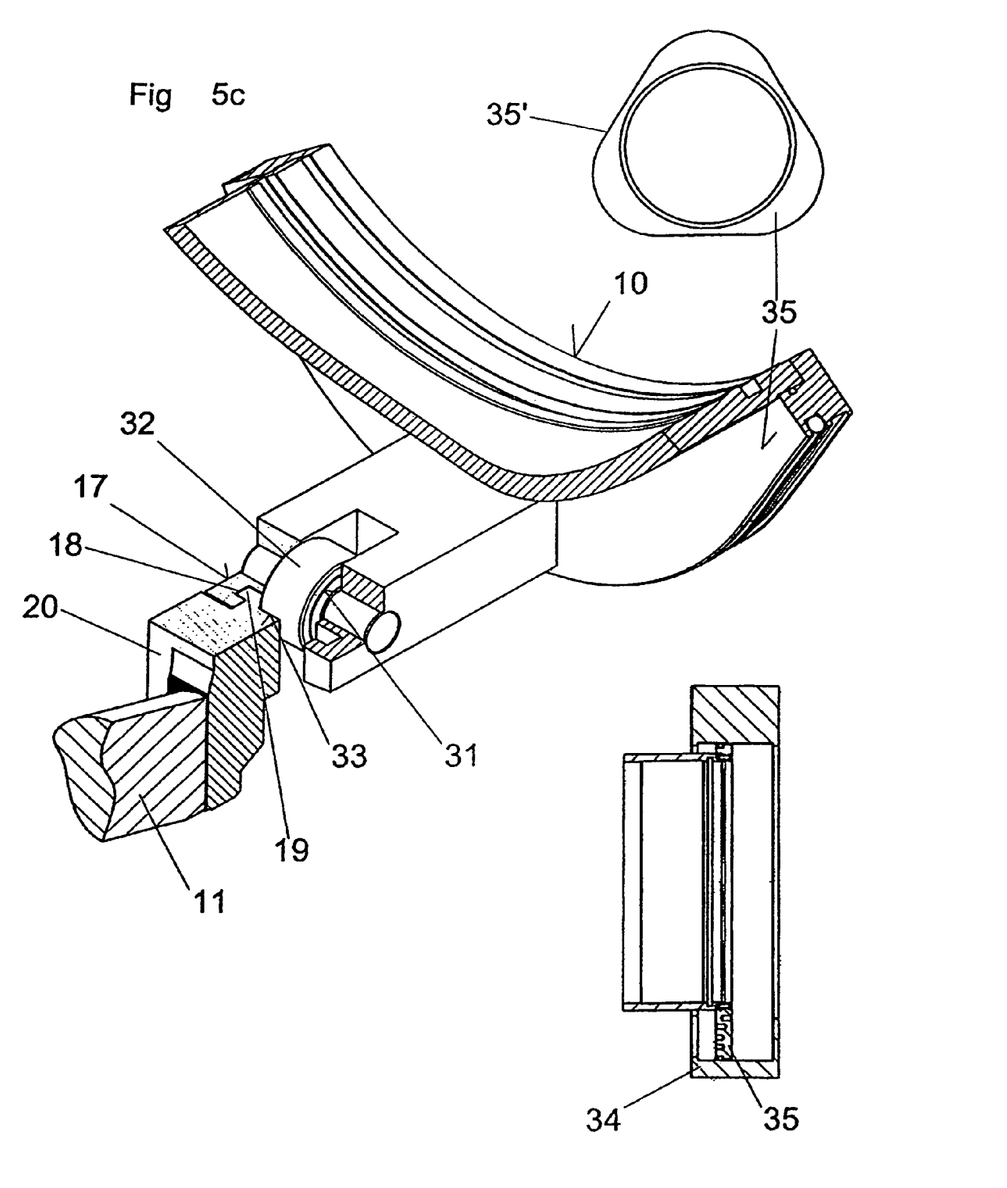
FIG. 5c is a perspective view showing the power-operated chuck in accordance with FIG. 5b with a clamping piston provided with a reduced surface area in the form of a polygonal structure.
Figure 5D:
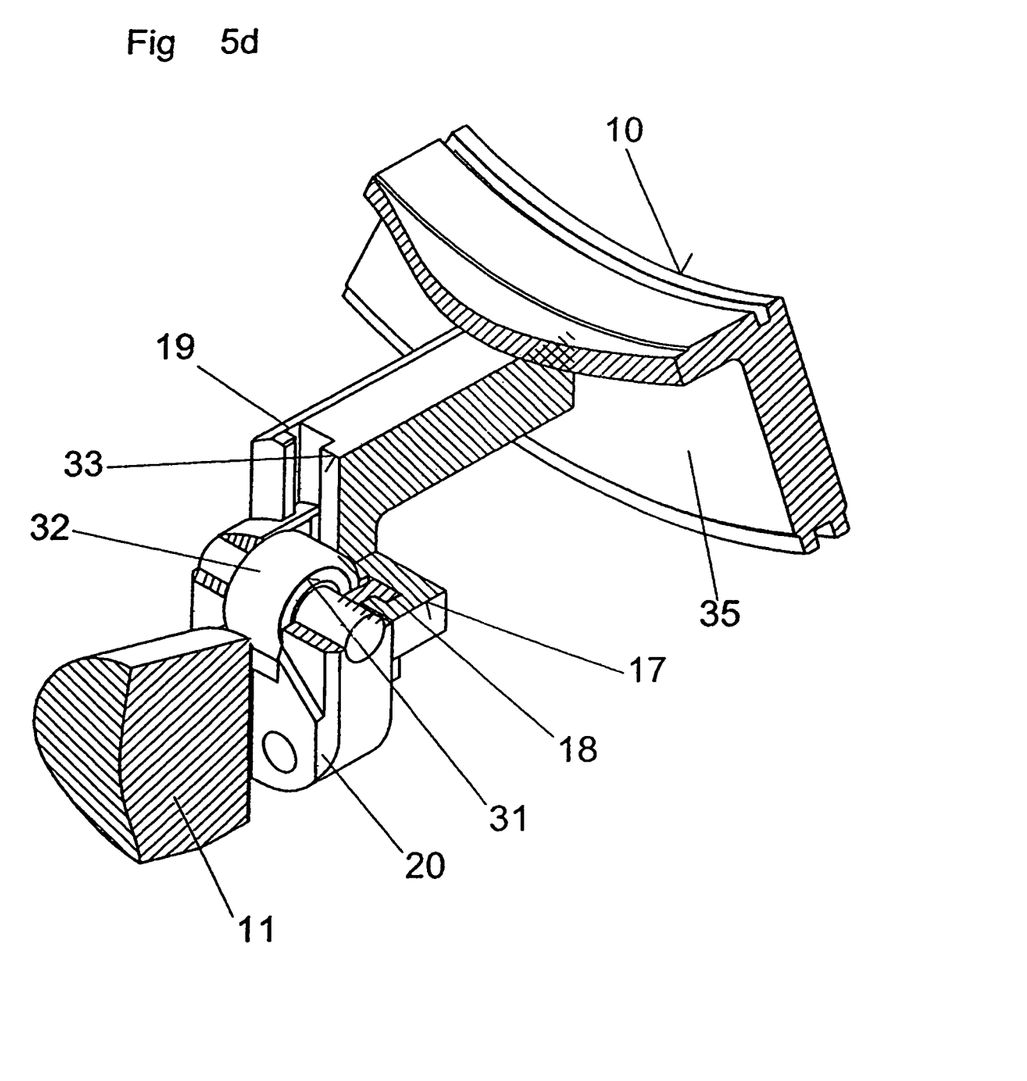
FIG. 5d is a perspective view showing the power-operated chuck in accordance with FIG. 2, in which a stop surface is worked onto a free end of the driving means in the form of a clamping piston, and with an anti-friction bearing in the form of a roller, mounted on an actuating pin, disposed in contact with the stop surface.

FIG. 5d shows the positive connection between the actuating pin 11 and the driving means 10, using an opposite mechanical arrangement to that shown in FIG. 5a, because in this embodiment variant, the roller 32 of the anti-friction bearing 31 is attached to the actuating pin 11 which is facing the free end of the driving means 10. The roller 32 makes contact with a contact surface 33 worked onto the free end of the driving means 10. The sliding pad 17, as well as the projections 19 formed onto the clamping piston 35, and the actuating pin 11, engage in the sliding pad 17, as already described, with the effect that the forces running parallel to the lengthways axis 2 between the actuating pin 11 and the clamping piston 35 are transmitted positively, and at the same time it is possible for a relative movement to take place at right angles to the lengthways axis 2.

FIGS. 5b and 5c show, furthermore, that the clamping piston 35 is completely enclosed by the advance piston 34, and thus the pressure space 39 is formed by the advance piston 34.

FIG. 5c shows that the surface area of the clamping piston 35 can be reduced further by means of a polygonal structure 35' compared to a round or ring-shaped contour, as a result of which the actuation forces F that can be transmitted are reduced further. The polygonal structure of the clamping piston 35 faces the advance piston 34 in this case, and runs in the inside of the pressure space 39.

Figure 5E:
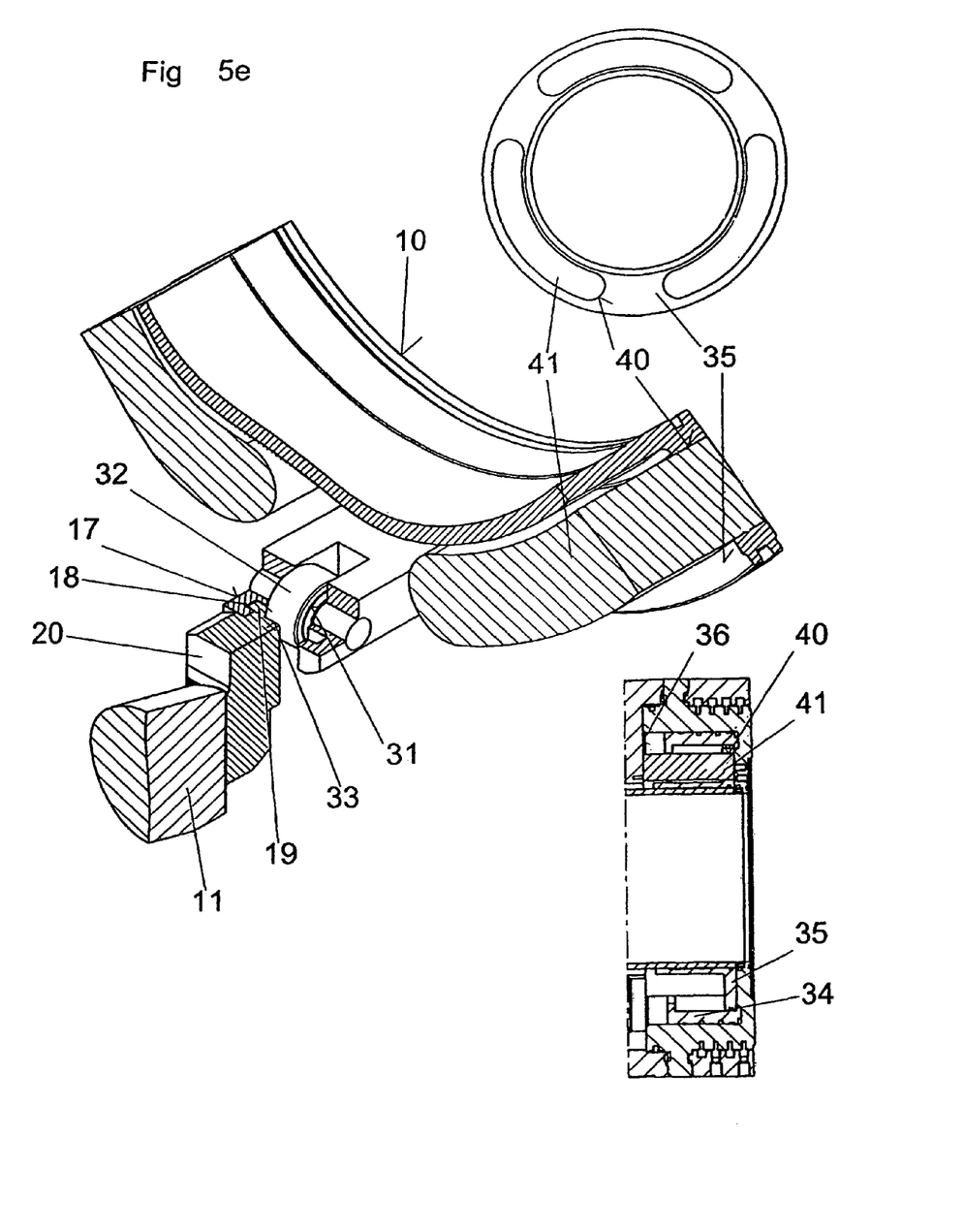
FIG. 5e illustrates the power-operated chuck in accordance with FIG. 5c, with a clamping piston, in the surface of which three kidney-shaped curved passage openings are worked, into each of which guide rods secured on the contact surface are arranged.
Figure 5F:
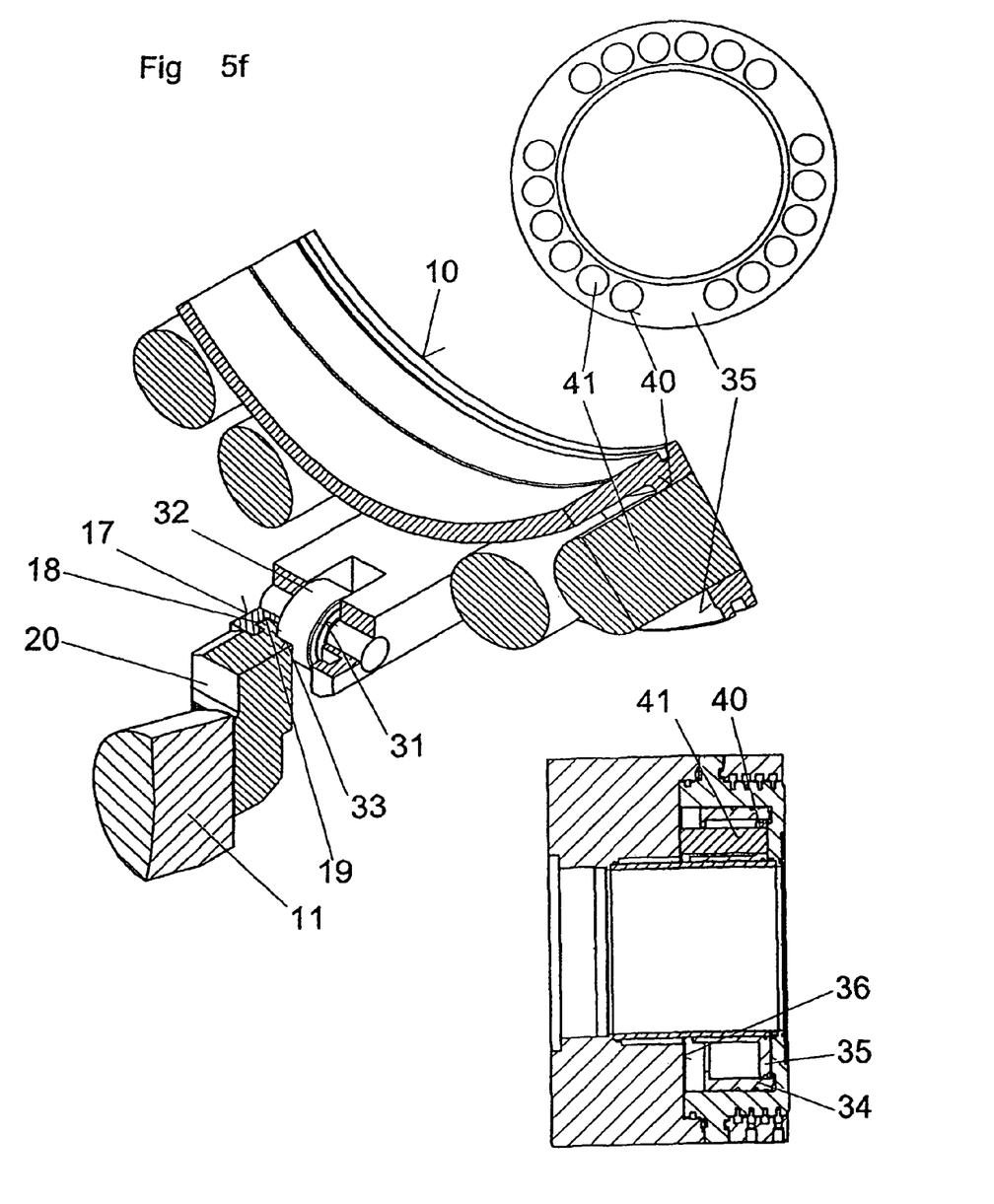
FIG. 5f illustrates the power-operated chuck in accordance with FIG. 5c, with a clamping piston, in the surface of which a plurality of round passage openings is worked, into each of which piston rods secured on the contact surface are arranged.

FIGS. 5e and 5f show that the surface area of the clamping piston 35 is reduced in size by means of passage openings 40 worked into it in order to accommodate one guide rod 41 each, with the effect that the available surface area of the clamping piston 35 is reduced. The cross-sectional shape of the passage openings 40 and their guide rod 41 adapted to them can have a kidney-shaped curve, or rounded, configuration. The corresponding guide rod 41 is attached in a positionally oriented way to the contact surface 36 of the chuck 3, and the clamping piston 35 moves relative to the fixed guide rods 41 that run in parallel to the movement direction of the clamping piston 35.

The invention claimed is:
1. A power-operated chuck for supporting cylindrically shaped workpieces which are to be machined by means of a machine tool in the areas of their free ends, the chuck comprising:
    a chuck body having a passage opening extending into its lengthways axis in order to accommodate a workpiece,
    a driving means for producing an actuation force, wherein the actuation force is absorbed by at least one actuating pin axially movably mounted in the chuck body, a guide hole disposed in said chuck body, the guide hole being angled in a direction of a free end of the workpiece, wherein an actuating pin is inserted in the guide hole, and at least three centring jaws, each mounted in a guide groove provided in the chuck body, and mounted so as to move radially in the direction of the workpiece, wherein each centring jaw interacts in a driving arrangement with one of the actuating pins, wherein an anti-friction bearing comprising a roller or a plain bearing is provided on an end of the driving means facing the actuating pin, a contact surface being provided on on the free end of the actuating pin and extending at a right angle to the lengthways axis of the chuck body, wherein the contact surface and the anti-friction bearing interact such that the actuation force of the driving means is transferred from the anti-friction bearing onto the contact surface of the actuating pin in an axial direction, and simultaneously a relative movement vectored at a right angle to the lengthways axis of the chuck body is released between the contact surface of the actuating pin and the anti-friction bearing;

wherein the driving means is formed by at least one advance piston and at least one clamping piston mounted one inside another in a telescopic arrangement, and further wherein the clamping piston is axially moveable relative to the advance piston in order to generate clamping force.

2. The power-operated chuck in accordance with claim 1, wherein an axial stroke movement of the advance piston is limited by a stop surface disposed on said chuck body.

3. The power-operated chuck in accordance with claim 2, wherein the advance piston and the clamping piston are adapted to be actuated pneumatically or hydraulically.

4. The power-operated chuck in accordance with claim 1, wherein a surface area of the clamping piston facing the advance piston comprises a polygonal structure, wherein one or more passage openings with a round or kidney-shaped curved cross-section is/are disposed in the surface area of the clamping piston, and further wherein a guide rod fixed onto the contact surface is disposed in each passage opening.

5. The power-operated chuck in accordance with claim 1, wherein the corresponding centring jaw is adjustable on the actuating pin in a radial direction relative to the actuating pin.

6. The power-operated chuck in accordance with claim 5, wherein an axial adjustment travel of the actuating pin is limited by a stop.

7. The power-operated chuck in accordance with claim 1, wherein a slot is disposed in each of the centring jaws which runs at a right angle to the lengthways axis of the chuck body, the centring jaws being adapted to be locked onto the actuating pin by one or more fastening screws, wherein the fastening screws pass through said slot and the fastening screws are supported in a threaded hole in the actuating pin.

8. The power-operated chuck in accordance with claim 7, wherein the length of said slot of the centring jaw is between one third and two thirds of the length of the centring jaw.

9. The power-operated chuck for supporting cylindrically shaped workpieces which are to be machined by means of a machine tool in the areas of their free ends, the chuck comprising:

a chuck body having a passage opening extending into its lengthways axis in order to accommodate a workpiece, a driving means for producing an actuation force, wherein the actuation force is absorbed by at least one actuating pin axially movably mounted in the chuck body, a guide hole disposed in said chuck body, the guide hole being angled in a direction of a free end of the workpiece, wherein an actuating pin is inserted in the guide hole, and at least three centring jaws, each mounted in a guide groove provided in the chuck body, and mounted so as to move radially in the direction of the workpiece, wherein each centring jaw interacts in a driving arrangement with one of the actuating pins, wherein an anti-friction bearing comprising a roller or a plain bearing is provided on an end of the driving means facing the actuating pin, a contact surface being provided on the free end of the actuating pin and extending at a right angle to the lengthways axis of the chuck body, wherein the contact surface and the anti-friction bearing interact such that the actuation force of the driving means is transferred from the anti-friction bearing onto the contact surface of the actuating pin in an axial direction, and simultaneously a relative movement vectored at a right angle to the lengthways axis of the chuck body is released between the contact surface of the actuating pin and the anti-friction bearing;

wherein a stabilisation sleeve is provided between the actuating pin and the guide hole, and wherein the length of the stabilisation sleeve is shorter than the length of the actuating pin.

10. The power-operated chuck in accordance with claim 9, wherein a hole in the actuating pin extends at a right angle to a lengthways axis of the actuating pin, wherein a detent pin and a coil compression spring are disposed in the hole, wherein the detent pin is pressed in the direction of an inner jacket surface of the stabilisation sleeve by the coil compression spring, and wherein the detent pin engages with a notch disposed in the inner jacket surface of the stabilisation sleeve, such that a connection is established between the actuating pin and the stabilisation sleeve.

11. The power-operated chuck in accordance with claim 10, wherein a hole is disposed in the chuck body and extends at a right angle to the lengthways axis of the actuating pin, wherein a detent pin and a coil compression spring are disposed in said hole, and wherein the detent pin engages with a notch disposed in an outer jacket surface of the stabilisation sleeve, such that a connection is established between the stabilisation sleeve and the chuck body.

12. The power-operated chuck for supporting cylindrically shaped workpieces which are to be machined by means of a machine tool in the areas of their free ends, the chuck comprising:

a chuck body having a passage opening extending into its lengthways axis in order to accommodate a workpiece, a driving means for producing an actuation force, wherein the actuation force is absorbed by at least one actuating pin axially movably mounted in the chuck body, a guide hole disposed in said chuck body, the guide hole being angled in a direction of a free end of the workpiece, wherein an actuating pin is inserted in the guide hole, and at least three centring jaws, each mounted in a guide groove provided in the chuck body, and mounted so as to move radially in the direction of the workpiece, wherein each centring jaw interacts in a driving arrangement with one of the actuating pins, wherein an anti-friction bearing comprising a roller or a plain bearing is provided on an end of the driving means facing the actuating pin, a contact surface being provided on the free end of the actuating pin and extending at a right angle to the lengthways axis of the chuck body, wherein the contact surface and the anti-friction bearing interact such that the actuation force of the driving means is transferred from the anti-friction bearing onto the contact surface of the actuating pin in an axial direction, and simultaneously a relative movement vectored at a right angle to the lengthways axis of the chuck body is released between the contact surface of the actuating pin and the anti-friction bearing;

wherein a sliding pad is provided between the driving means and the actuating pin, wherein two guide openings disposed in the sliding pad are arranged at a distance from one another and extend parallel with one another, and wherein projections formed on the driving means and the actuating pin are inserted into a corresponding guide opening, and are movably mounted therein.

13. The power-operated chuck in accordance with claim 12, wherein the anti-friction bearing is arranged on the sliding pad between the two guide openings.

14. A power-operated chuck for supporting cylindrically shaped workpieces which are to be machined by means of a machine tool in the area of their free ends, the chuck comprising:
  a chuck body having a passage opening extending into its lengthways axis in order to accommodate a workpiece,
  a driving means for producing an actuation force which is absorbed by at least one actuating pin in an axially movable mounting in said chuck body,
  a guide hole disposed in said chuck body, said guide hole being angled in the direction of a free end of the workpiece to be machined, and an actuating pin inserted therein, and
  at least three centring jaws, each mounted in a guide groove provided in said chuck body, and mounted so as to move radially in the direction of the workpiece, each of which interacts in a driving arrangement with one of said actuating pins,
  an anti-friction bearing comprising a roller provided on a free end of the actuating pin facing the driving means, a contact surface disposed on a free end of said driving means facing the actuating pin running at right angles to the lengthways axis of said chuck body, said contact surface and said roller of said anti-friction bearing interacting such that an actuation force of said driving means is transferred via its contact surface in an axial direction onto said roller of said anti-friction bearing or the plain bearing attached to said actuating pin, and simultaneously a relative movement vectored at right angles to the lengthways axis of said chuck body is released between the contact surface of said driving means and said roller of said anti-friction bearing or the plain bearing of the actuating pin.

15. The power-operated chuck in accordance with claim 14, wherein the driving means is formed by at least one advance piston and at least one clamping piston mounted one inside another in a telescopic arrangement, and further wherein the clamping piston is axially moveable relative to the advance piston in order to generate clamping force.

16. The power-operated chuck in accordance with claim 14, wherein an axial stroke movement of the advance piston is limited by a stop surface disposed on said chuck body.

17. The power-operated chuck in accordance with claim 16, wherein the advance piston and the clamping piston are adapted to be actuated pneumatically or hydraulically.

18. The power-operated chuck in accordance with claim 14, wherein a surface area of the clamping piston facing the advance piston comprises a polygonal structure, wherein one or more passage openings with a round or kidney-shaped curved cross-section is/are disposed in the surface area of the clamping piston, and further wherein a guide rod fixed onto the contact surface is disposed in each passage opening.

19. The power-operated chuck in accordance with claim 14, wherein the corresponding centring jaw is adjustable on the actuating pin in a radial direction relative to the actuating pin.

20. The power-operated chuck in accordance with claim 19, wherein an axial adjustment travel of the actuating pin is limited by a stop.

21. The power-operated chuck in accordance with claim 14, wherein a stabilisation sleeve is provided between the actuating pin and the guide hole, and wherein the length of the stabilisation sleeve is shorter than the length of the actuating pin.

22. The power-operated chuck in accordance with claim 21, wherein a hole in the actuating pin extends at a right angle to a lengthways axis of the actuating pin, wherein a detent pin and a coil compression spring are disposed in the hole, wherein the detent pin is pressed in the direction of an inner jacket surface of the stabilisation sleeve by the coil compression spring, and wherein the detent pin engages with a notch disposed in the inner jacket surface of the stabilisation sleeve, such that a connection is established between the actuating pin and the stabilisation sleeve.

23. The power-operated chuck in accordance with claim 22, wherein a hole is disposed in the chuck body and extends at a right angle to the lengthways axis of the actuating pin, wherein a detent pin and a coil compression spring are disposed in said hole, and wherein the detent pin engages with a notch disposed in an outer jacket surface of the stabilisation sleeve, such that a connection is established between the stabilisation sleeve and the chuck body.

24. The power-operated chuck in accordance with claim 14, wherein a slot is disposed in each of the centring jaws which runs at a right angle to the lengthways axis of the chuck body, the centring jaws being adapted to be locked onto the actuating pin by one or more fastening screws, wherein the fastening screws pass through said slot and the fastening screws are supported in a threaded hole in the actuating pin.

25. The power-operated chuck in accordance with claim 24, wherein the length of said slot of the centring jaw is between one third and two thirds of the length of the centring jaw.

26. The power-operated chuck in accordance with claim 14, wherein a sliding pad is provided between the driving means and the actuating pin, wherein two guide openings disposed in the sliding pad are arranged at a distance from one another and extend parallel with one another, and wherein projections formed on the driving means and the actuating pin are inserted into a corresponding guide opening, and are movably mounted therein.

27. The power-operated chuck in accordance with claim 26, wherein the anti-friction bearing is arranged on the sliding pad between the two guide openings.

* * * * *